(12) United States Patent  (10) Patent No.: US 8,249,442 B2
Yasuda et al.  (45) Date of Patent: Aug. 21, 2012

(54) FLASH UNIT AND IMAGING APPARATUS (75) Inventors: Koji Yasuda, Osaka (JP); Tetsuya Mori, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/859,369

(22) Filed: Aug. 19, 2010

(65) Prior Publication Data
US 2011/0052171 A1   Mar. 3, 2011

(30) Foreign Application Priority Data
Aug. 27, 2009 (JP) .................................. 2009-196243

(51) Int. Cl.
G03B 15/03 (2006.01)
(52) U.S. Cl. ......................................................... 396/176
(58) Field of Classification Search ........... 396/175–178
See application file for complete search history.

(56) References Cited

U.S. PATENT DOCUMENTS

| | | | |
|---|---|---|---|
| 4,653,883 A * | 3/1987 | Maeno | 396/28 |
| 4,893,140 A | 1/1990 | Yamamoto et al. | |
| 4,910,542 A * | 3/1990 | Yamamoto et al. | 396/165 |
| 5,066,967 A | 11/1991 | Yamamoto et al. | |
| 5,280,316 A | 1/1994 | Fukahori et al. | |
| 5,329,327 A * | 7/1994 | Arai et al. | 396/177 |
| 6,104,882 A * | 8/2000 | Inazuka | 396/177 |
| 6,226,456 B1 * | 5/2001 | Hazama et al. | 396/6 |
| 6,611,663 B2 * | 8/2003 | Nakagawa | 396/62 |
| 2004/0071459 A1 | 4/2004 | Ujikane et al. | |
| 2009/0103911 A1 * | 4/2009 | Ikemizo et al. | 396/174 |
| 2011/0044681 A1 * | 2/2011 | Yasuda | 396/177 |

FOREIGN PATENT DOCUMENTS

| | | |
|---|---|---|
| JP | 4-142522 | 5/1992 |
| JP | 6-17963 | 3/1994 |
| JP | 2560270 | 10/1997 |
| JP | 2591503 | 12/1998 |
| JP | 2004-151684 | 5/2004 |
| JP | 3728044 | 10/2005 |

* cited by examiner

*Primary Examiner* — Clayton E LaBalle
*Assistant Examiner* — Dennis Hancock
(74) *Attorney, Agent, or Firm* — Panasonic Patent Center; Dhiren Odedra; Kerry Culpepper (57) ABSTRACT

A flash unit includes a flash device operable to emit flash, a storage member operable to store the flash device, a cover with which the storage member is covered from above, and to which the flash device is attached, a first link member that is turnably connected to the storage member at one end and turnably connected to the cover at another end, and a retaining member. The first link member is stored in the storage member in a lying state when the flash device is not used, and the first link member is adapted to turn about a connection portion of the first link member and the storage member to take a raised up state in which a connection portion of the first link member and the cover is located above the connection portion of the first link member with the storage member when the flash device is used, the cover can turn about the connection portion with the first link member to take the raised up state in which the flash device is raised higher than the connection portion with the first link member, and the retaining member retains the first link member in the raised up state.

19 Claims, 6 Drawing Sheets

FLASH UNIT AND IMAGING APPARATUS

BACKGROUND

1. Technical Field

The technical field relates to a flash unit that emits flash light and an imaging apparatus provided with the flash unit.

2. Related Art

The flash unit is a unit that emits flash light in order to compensate for a lack of a light quantity when an image is taken with an imaging apparatus such as a camera. In the camera provided with the flash unit, for example, the flash unit is frequently disposed in an upper portion on a front surface side of a camera body.

A projected lens barrel is frequently provided on the front surface side of the imaging apparatus with projected. Therefore, the light emitted from the flash unit is blocked by the lens barrel, which sometimes results in a problem of "eclipse" in which an outline of the lens barrel is taken in the image depending on a shooting angle of view.

Japanese Patent No. 3728044 discloses an art for reducing the eclipse problem. The camera disclosed in Japanese Patent No. 3728044 is so configured that a flash device can be popped up upwardly from a top end of a camera body.

When a relatively large lens is provided such as a high-magnification camera, or when a large lens is attached to an interchangeable lens type camera, the eclipse is easily generated compared with the case in which a standard-class lens is used. Therefore, in the use of the flash unit, the flash device is preferably located upward and forward as much as possible.

On the other hand, there is a demand for miniaturization in electronic instruments such as the camera.

To solve the foregoing problem, a flash unit which makes a use position of the flash device be located upward and forward as much as possible while being compactly placed in a chassis of the electronic instrument, and an imaging apparatus provided with the flash unit are provided.

SUMMARY

In a first aspect, there is provided a flash unit. The flash unit includes a flash device operable to emit light, a storage member operable to store the flash device, a cover with which the storage member is covered from above, and to which the flash device is attached, a first link member that is turnably connected to the storage member at one end, while turnably connected to the cover at another end, and a retaining member, wherein the first link member is stored in the storage member in a lying state when the flash device is not used, and the first link member is adapted to turn about a connection portion of the first link member and the storage member to take a raised up state in which a connection portion of the first link member and the cover is located above the connection portion of the first link member with the storage member when the flash device is used, the cover can turn about a connection portion with the first link member to take the raised up state in which the flash device is raised higher than the connection portion with the first link member, and the retaining member retains the first link member in the raised up state.

In a second aspect, there is provided an imaging apparatus including the flash unit of the first aspect.

According to the flash unit and imaging apparatus of the aspects, when the flash unit is used, the cover attached to the flash device can be raised higher by making the first link member for coupling the cover with the storage member be in the raised up state. Additionally, the flash unit attached to the cover can further be raised higher by making the cover be in the raised up state. The flash device can be projected forward by making the cover which is in the raised up state lean forward.

When the flash device is not used, the first link member is placed in the storage member in lying state, and thus the flash unit can compactly be configured.

DETAILED DESCRIPTION OF PREFERRED EMBODIMENT

A preferred embodiment will be described with reference to the drawings. In the embodiment, a digital camera includes a flash unit. The flash unit can take two states, that is, a closed state in which the flash unit is placed inside an upper surface of the digital camera and an opened state in which the flash unit is largely popped up upward and forward from the upper surface of the digital camera.

1. Embodiment

1-1. Appearance

Figure 1A:
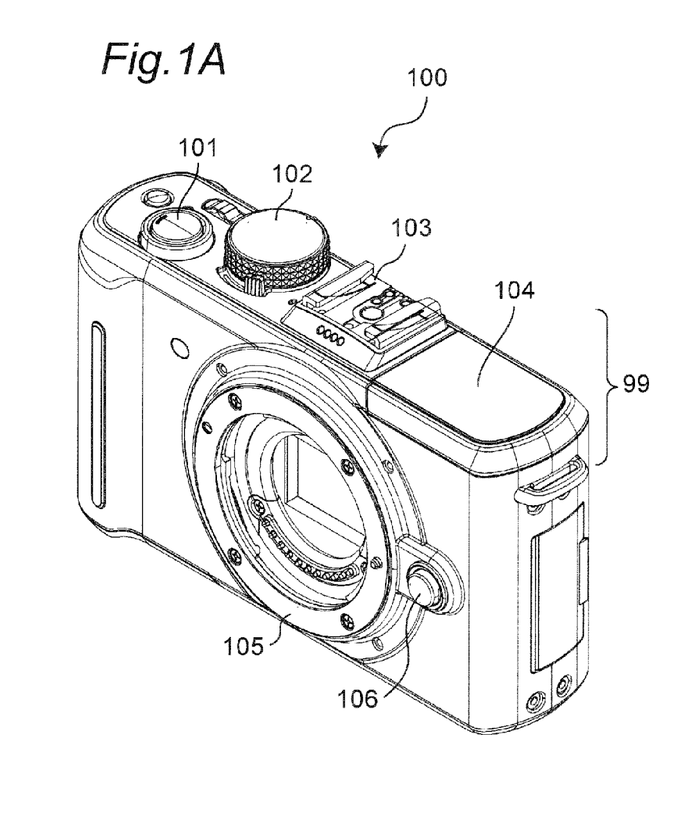
FIG. 1A is a perspective view of a digital camera according to an embodiment (a state in which a flash unit is placed below and inside an upper surface).
Figure 1B:
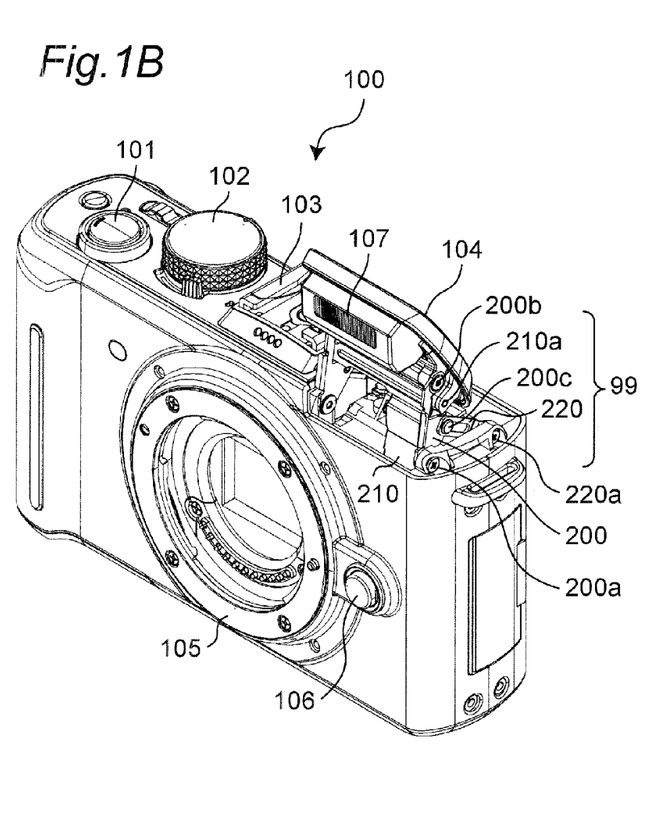
FIG. 1B is a perspective view of the digital camera of the embodiment (a state in which the flash unit is popped up from the upper surface).
Figure 2A:
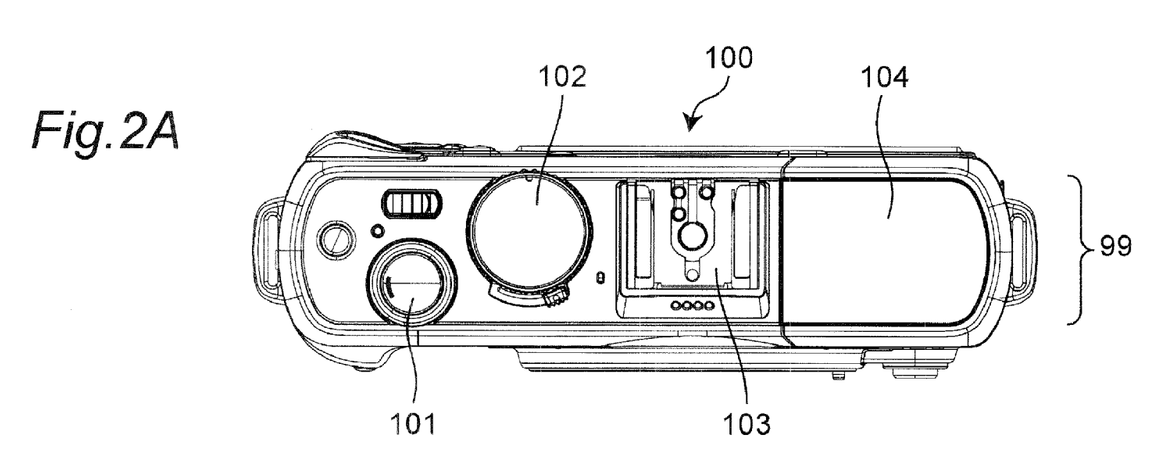
FIG. 2A is a top view of a digital camera according to an embodiment (the state in which the flash unit is placed below and inside the upper surface).
Figure 2B:
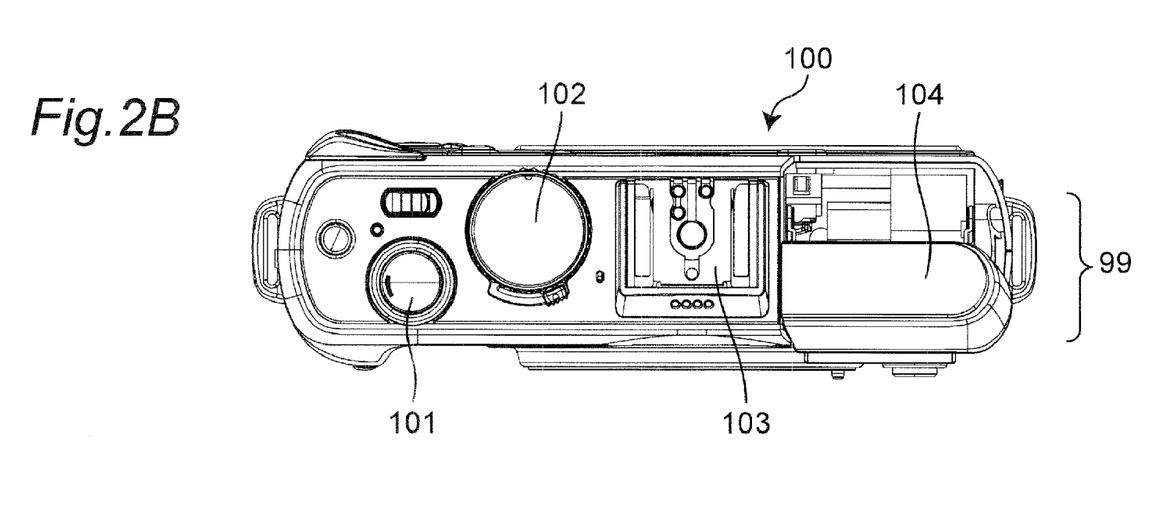
FIG. 2B is a top view of the digital camera of the embodiment (the state in which the flash unit is popped up from the upper surface).
Figure 3A:
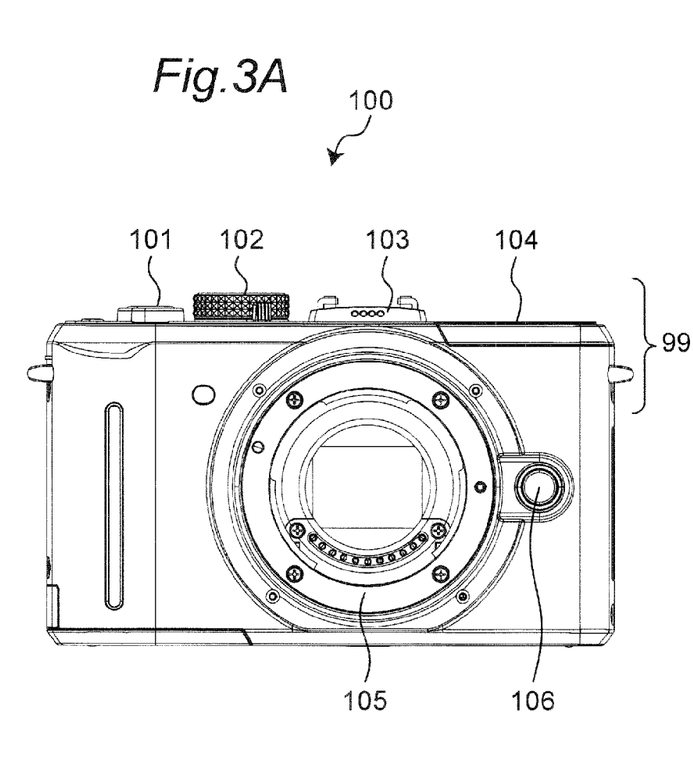
FIG. 3A is a front view of a digital camera according to an embodiment (the state in which the flash unit is placed below and inside the upper surface).
Figure 3B:
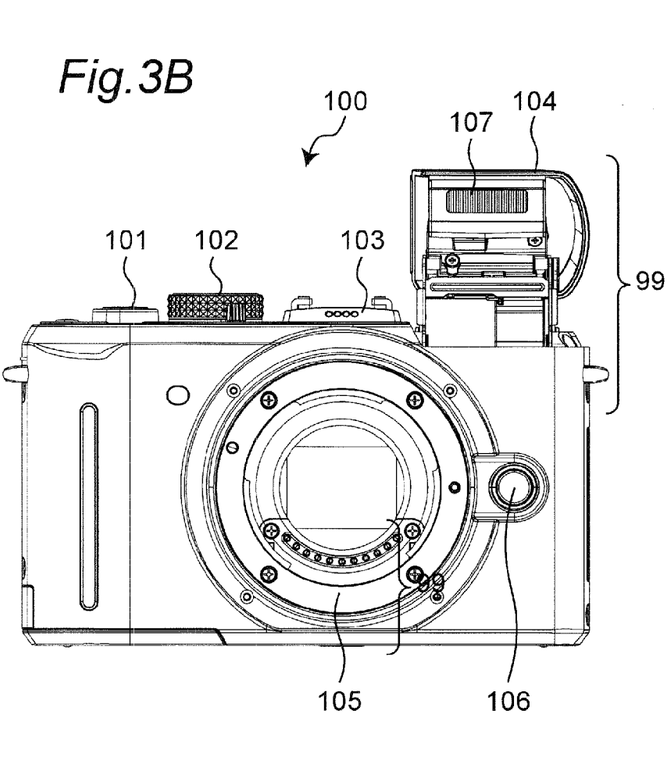
FIG. 3B is a front view of the digital camera of the embodiment (the state in which the flash unit is popped up from the upper surface).
Figure 4A:
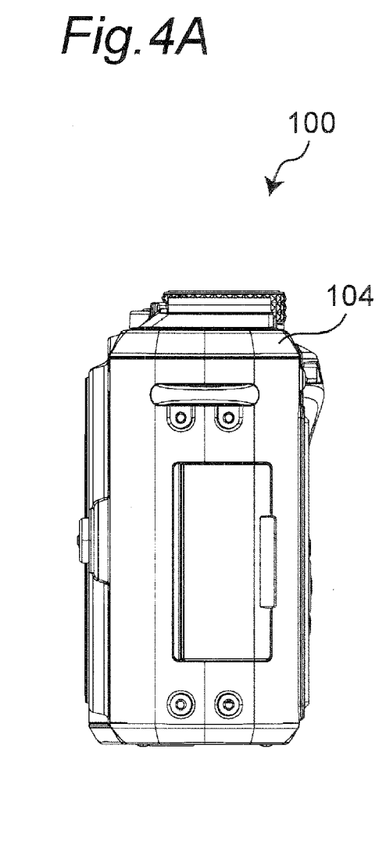
FIG. 4A is a side view of a digital camera according to an embodiment (the state in which the flash unit is placed below and inside the upper surface).
Figure 4B:
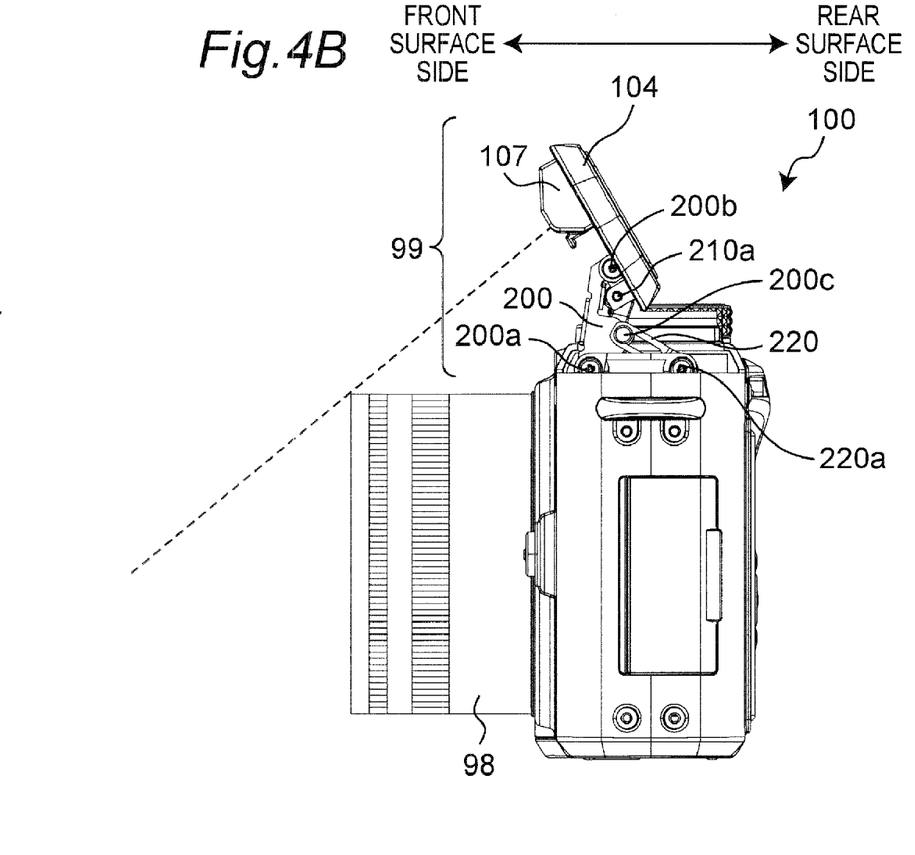
FIG. 4B is a side view of the digital camera of the embodiment (the state in which the flash unit is popped up from the upper surface).

FIGS. 1A, 1B, 2A, 2B, 3A, 3B, 4A, and 4B are appearance views of a digital camera provided with a flash unit. FIGS. 1A and 1B are perspective views of the digital camera. FIGS. 2A and 2B are top views of the digital camera. FIGS. 3A and 3B are front views of the digital camera. FIGS. 4A and 4B are side views of the digital camera. In FIGS. 1A, 1B, 2A, 2B, 3A, 3B, 4A, and 4B and after-mentioned FIGS. 5, 6A and 6B, the same component is designated by the same numeral.

FIGS. 1A, 2A, 3A, and 4A show a closed state in which a flash unit 99 is placed below and inside an upper surface of the digital camera 100. FIGS. 1B, 2B, 3B, and 4B show an opened state in which the flash unit 99 is largely popped up upward and forward from the upper surface of the digital camera 100.

An appearance of the digital camera 100 will be described with reference to FIGS. 1A and 1B. In the upper surface of a chassis of the digital camera 100, in addition to the flash unit 99, the digital camera 100 includes various operation devices such as a release button 101, a mode dial 102, and a shoe 103 for attachment of an external device. The release button 101 receives an operation of a user to perform an autofocus operation or a record operation for recording taken image data. The mode dial 102 switches recording mode such as an aperture-priority mode, a shutter speed-priority mode, and a manual mode. The shoe 103 is provided to connect an external flash device or an external viewfinder to the digital camera 100, connecting the digital camera 100 electrically and mechanically to the external device.

The flash unit 99 includes a flash unit cover 104, a flash device 107, a first link lever 200, a second link lever 220, and a driving lever 210. The detailed configuration of the flash unit 99 is described later. In the closed state, the flash unit 99 is placed in a flash unit storage box 300 (see FIGS. 6A and 6B) that is located below and inside the upper surface of the digital camera 100. In the state in which the flash unit 99 is placed inside the digital camera 100, only the flash unit cover 104 is exposed to the outside. The flash unit cover 104 occupies a whole area of the upper surface of one shoulder portion of the digital camera 100, and the depth of the cover 104 is equal to that of the digital camera 100. Therefore, the flash unit 99 is enlarged so far as the depth of the digital camera 100 permits, so that the flash device 107 can be raised as higher as possible.

A lens mount 105 and a lens detaching button 106 are provided in the front surface of the digital camera 100. The lens 98 (see FIG. 4B) can be mounted on the digital camera 100 with the lens mount 105 interposed therebetween. Various lenses can be used. The lens 98 mounted on the digital camera 100 can be detached by pressing down the lens detaching button 106.

In the opened state, the flash unit 99 is largely popped up upward and forward from the upper surface of the digital camera 100. Therefore, the flash unit 99 can avoid eclipse of the flash light caused by the existence of the lens 98 when the flash device 107 emits the flash light.

1-2. Configuration of Flash Unit

Figure 5:
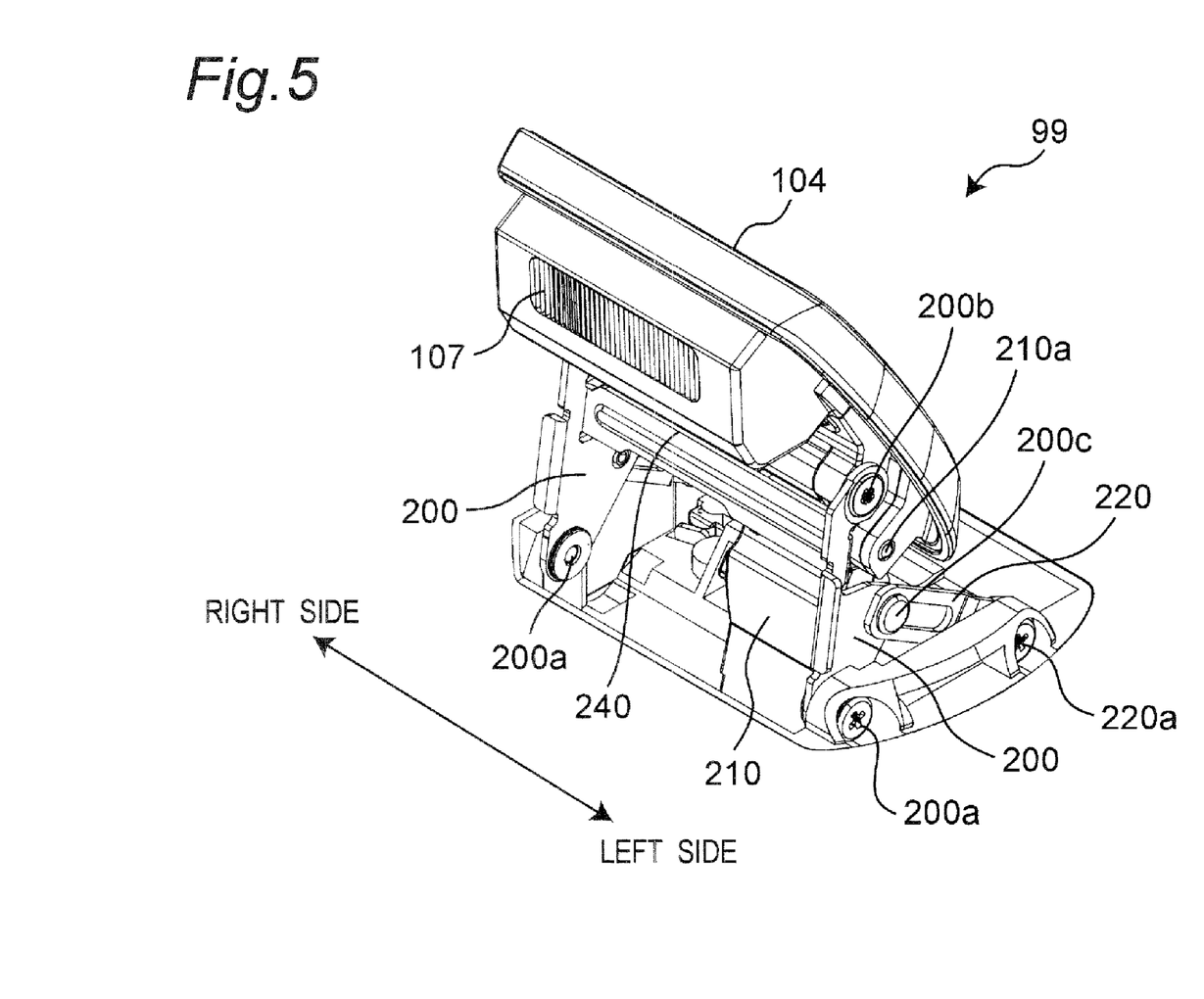
FIG. 5 is a perspective view of the flash unit of the embodiment.
Figure 6A:
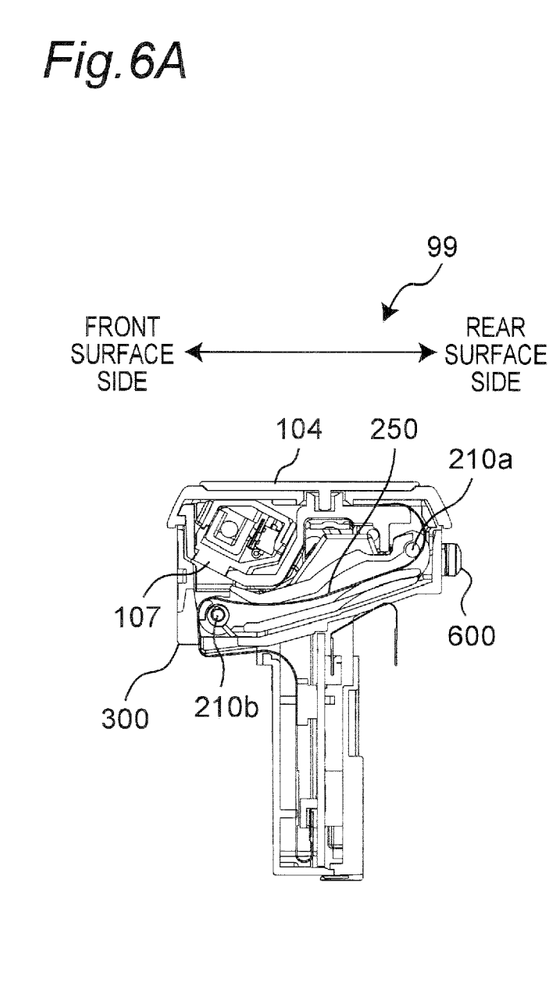
FIG. 6A is a sectional view of the flash unit of the embodiment in a front-back direction (the state in which the flash unit is placed below and inside the upper surface).
Figure 6B:
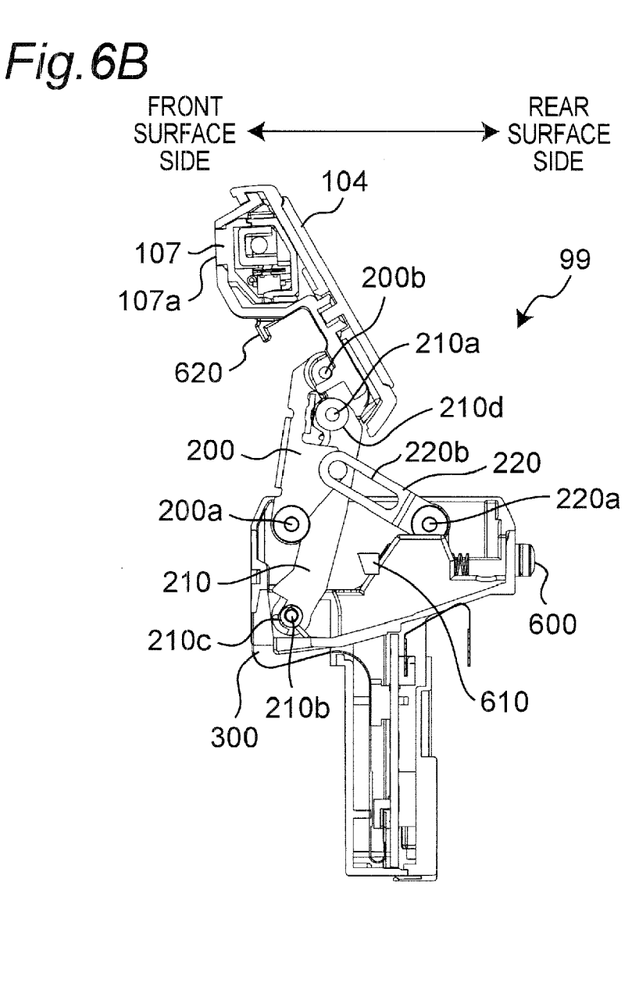
FIG. 6B is a sectional view of the flash unit of the embodiment in the front-back direction (the state in which the flash unit is popped up from the upper surface).

FIG. 5 is a perspective view of the flash unit 99. FIGS. 6A and 6B show a section in a front-back direction of the flash unit 99. FIG. 6A shows the closed state in which the flash unit 99 is placed below and inside the upper surface of the digital camera 100. FIG. 6B shows the opened state in which the flash unit 99 is largely popped up upward and forward from the upper surface of the digital camera 100.

As shown in FIGS. 1B, 4B, 5, and 6B, the flash unit 99 includes the flash unit cover 104, the flash device 107, the first link lever 200, the second link lever 220, and a driving lever 210. As shown in FIG. 6B, the flash unit 99 also includes the flash unit storage box 300, a raise up button 600, a latching portion 610, and a latched portion 620.

Hereinafter, as shown in FIGS. 6A and 6B, a side to which a light-emitting surface 107a of the flash device 107 points in a state in which the flash unit 99 is popped up is referred to as "a front surface side" of the flash unit 99, and an opposite side to the front surface side is referred to as "a rear surface side" of the flash unit 99. As shown in FIG. 5, a observer's right side of the flash device 107 in a state to which the flash device 107 points to the front side is referred to as "a right side" of the flash unit 99, and an opposite side to the right side is referred to as "a left side" of the flash unit 99.

Hereinafter, a structure of the flash unit 99 or the like will specifically be described with reference to FIG. 6A and 6B. The flash unit cover 104 includes the flash device 107 that emits the flash light. The flash device 107 is located near the front surface side of the digital camera 100 in the front-back direction when the flash unit 99 is in the closed state. The flash device 107 is not exposed to the outside of the digital camera 100 when the flash device 107 is placed in the flash unit storage box 300. The flash device 107 includes a xenon tube as a flash element, a reflector shade as a reflector plate, a reflector shade support frame, and a Fresnel lens. The flash unit 99 is connected to a flash circuit that includes a capacitor, a booster circuit, and a light emission trigger circuit. The flash circuit is provided in the digital camera 100. The flash circuit controls a flashing operation of the flash device 107 according to a control signal transmitted from a controller that wholly controls the operation of each unit of the digital camera 100.

The flash device 107 includes the latched portion 620. In the closed state of the flash unit 99, the latched portion 620 is latched in the latching portion 610 included in the flash unit storage box 300 (Note: the state in which the latched portion 620 is latched is not shown in FIG. 6A). The raise up button 600 interlocks with the operation of the latching portion 610. The latching state between the latched portion 620 and the latching portion 610 is released by pressing down the raise up button 600.

The driving lever 210 links (connects) the flash unit cover 104 and the flash unit storage box 300 with each other. In the closed state of the flash unit 99, the driving lever 210 is, at its one end, turnably supported near the rear surface side of the flash unit 99 by a pin 210a. The driving lever 210 is, at its other end, turnably supported near a lower portion of the front surface side of the flash unit storage box 300 by a pin 210b. The driving lever 210 is biased in a pop-up direction (counterclockwise about the pin 210b in FIG. 6B) by a torsion spring 210c that exists near the pin 210b. In other words, when the raise up button 600 is pressed down in the closed state of the flash unit 99, the latching state between the latched portion 620 and the latching portion 610 is released, so that the driving lever 210 is popped up by a biasing force of the torsion spring 210c (the driving lever 210 turns counterclockwise about the pin 210b to substantially raise up).

The flash unit cover 104 is biased in a direction in which the flash device 107 is raised upward (clockwise about the pin 210a in FIG. 6B) by a torsion spring 210d that exists near the pin 210a. In other words, when the driving lever 210 is popped up (when the driving lever 210 turns clockwise about the pin 210b in FIG. 6B), the flash unit cover 104 is raised up such that the flash device 107 is located upward as shown in FIG. 6B (the flash unit cover 104 turns clockwise about the pin 210a to substantially raise up). At this point, the flash unit cover 104 orients a light-emitting surface 107a of the flash device 107 that is not exposed to the outside in the closed state toward the front surface, and the whole of the flash unit cover 104 is projected upward from the flash unit storage box 300. Therefore, the use position of the flash unit 99 can be raised by a raise up amount of the flash unit cover 104 (corresponding to the depth of the flash unit cover 104) plus the pop-up height of the driving lever 210 (corresponding to a length of the driving lever 210).

The first link lever 200 links the flash unit cover 104 and the flash unit storage box 300 with each other. The first link lever 200 is, at its one end, turnably supported near the upper portion of the front surface side of the flash unit storage box 300 by a pin 200a. The first link lever 200 is, at its other end, turnably supported near the rear surface side of the flash unit cover 104 by a pin 200b. The first link lever 200 includes a stopping pin 200c near the center in a longitudinal direction. Although the first link lever 200 that is provided on the left side of the flash unit 99 is described above, a link lever having a configuration similar to that of the first link lever 200 is also provided on the right side of the flash unit 99.

A position of a connection portion of the first link lever 200 and the flash unit cover 104 (a position of the pin 200b) differs from a position of a connection portion of the driving lever 210 and the flash unit cover 104 (a position of the pin 210a) (see FIG. 6B). The cover 104 is supported by two points, that is, the first link lever 200 and driving lever 210. As is clear from FIG. 6B, a position of a connection portion of the first link lever 200 and the flash unit storage box 300 (a position of the pin 200a) differs from a position of a connection portion of the driving lever 210 and the flash unit storage box 300 (a position of the pin 210b). In this manner because the flash unit cover 104 is supported by the first link lever 200 and the driving lever 210, and thus the flash unit cover 104 and the flash device 107 are stably raised with a constant trace by the levers 200 and 210. Because the flash unit cover 104 is supported by the two points as described above, when the flash unit cover 104 is pushed from above with a finger or the like to return the flash unit 99 to a storage position, the flash unit cover 104 can smoothly be pressed down with a constant trace without instability of trace of pop-up.

The second link lever 220 links (connects) the first link lever 200 and the flash unit storage box 300 each other. The second link lever 220 is, at its one end, turnably supported near the upper surface of the rear surface side of the flash unit storage box 300 by a pin 220a. The second link lever 220 has at the other end side a long hole 220b that extends in the longitudinal direction. A stopping pin 200c of the first link lever 200 is fitted in the long hole 220b of the second link lever 220 to be movable in the long hole 220b. When the stopping pin 200c moves to pin 220a in the long hole 220b, the first link lever 200 and the second link lever 220 turn clockwise about the pin 200a and the pin 210b to change from the raised up state to the lying state, and the flash device 107 is placed in the flash unit storage box 300. On the other hand, when the stopping pin 200c moves onto the front surface side in the long hole 220b, the stopping pin 200c contacts an end portion of the long hole 220b to prevent the first link lever 210 from moving due to the biasing force in the pop-up direction of the torsion spring 210c by an amount equal to or greater than a predetermined amount, in the raised up direction of the first link lever 200. Particularly the second link lever 220 stops the movement at the position at which the first link lever 200 is substantially in the raised up state. At this point, the position of the flash unit cover 104 is retained as the use position. Thus, compared with the storage state, the height of the use position of the flash device 107 can substantially increase by total amount of length of the first link lever 200 and depth of the flash unit cover 104.

As the driving lever 210 is popped up by the biasing force, the second link lever 220 is oriented obliquely upward from the flash unit storage box 300 about the rotation axis of the pin 220a. In other words, the long hole 220b of the second link lever 220 is also oriented obliquely upward. The stopping pin 200c moves obliquely upward in the long hole 220b that is oriented obliquely upward, and thus the whole of the flash unit cover 104 is largely brought up upward and forward. Although the second link lever 220 that is provided on the left side of the flash unit 99 is described above, a link lever having a configuration similar to that of the second link lever 220 is also provided on the right side of the flash unit 99.

The first link levers 200 on the right and left of the flash unit 99 are coupled by a reinforcement bridge 240. Thus, the first link lever 200 can be reinforced so as to withstand the pop-up of the flash unit 99. Therefore the pop-up operation of the flash unit 99 can stably be performed.

According to the flash unit 99 of the first embodiment, the flash unit that can largely be popped up upward and forward with respect to the digital camera 100 while compactly stored in the chassis of the digital camera 100 can be implemented. That is the end portion on the rear surface side of the flash unit cover 104 is more largely brought up forward by the mechanism including the first link lever 200, the second link lever 22, and the driving lever 210, compared to the closed state. Therefore, the flash device 107 is largely brought up not only in the height direction but also in the forward direction. Accordingly, the flash unit capable of that avoiding the eclipse caused by the existence of the lens 98 even though being incorporated in the digital camera 100 can be provided.

In the flash unit 99 of the first embodiment, the flash unit cover 104 is configured to occupy the whole area of the upper surface of one shoulders of the digital camera 100. Therefore, the flash device 107 can be enlarged, and the use position of the flash device 107 can be raised by the amount corresponding to the depth of the flash unit cover 104, that is, the amount corresponding to the depth of the digital camera 100, when the flash unit 99 is popped up. Because the flash unit cover 104 is set so as to lean forward when the flash unit cover 104 is projected upward, the light-emitting surface 107a of the flash device 107 can also be projected from the front surface (a surface on which the lens 98 is mounted) of the digital camera 100.

The first link lever 200 is, at its one end, turnably connected to the front portion of the flash unit storage box 300, at its other end, is turnably connected to the rear portion of the flash unit cover 104, and the flash device 107 is attached to the rear surface of the flash unit cover 104. Therefore, as shown in FIG. 6B, the flash device 107 can be located at the high position on the front surface side of the digital camera 100 as much as possible when the flash unit 99 is popped up. Since the flash device 107 is attached near the front end portion in the rear surface of the flash unit cover 104, the flash device 107 can be located at the higher position.

When the flash device 107 is not used, because the first link lever 200 is almost placed in the lying state and placed in the flash unit storage box 300, so that the flash unit 99 can compactly be configured.

The driving lever 210 has a cylindrical structure, and electric wiring 250 to connect the side of the flash unit storage box 300 and the flash device 107 with each other is passed through an internal space of the driving lever 210. Accordingly, with this arrangement, when the flash unit 99 is popped up, the driving lever 210 can well protect the electric wiring 250 such that the electric wiring 250 does not interfere with the first link lever 200 or the second link lever 220.

The interchangeable lens type digital camera 100 is described in the embodiment. However, the concept of the embodiment can also be applied to cameras other than the interchangeable lens type camera.

In the embodiment, the driving lever 210 is popped up by the biasing force of the torsion spring 210c. Alternatively, the first link lever 200 may be popped up by the biasing force.

1-3. Correspondence Relationship

The flash device 107 is an example of the flash device. The flash unit cover 104 is an example of the cover. The flash unit accommodation box 300 is an example of the storage member. The first link lever 200 is an example of the first link member. The second link lever 220 is example of the retaining member. The second link member is an example of the driving lever 210. The helical spring 210c is an example of the biasing unit. The flash unit 99 is an example of the flash unit. The digital camera 100 is an example of the imaging apparatus. The electric wiring 250 is an example of the electric wiring.

Industrial Applicability

The flash unit of the present embodiment can be applied to not only the digital camera but also a film camera, a movie camera, a camera-equipped cellular phone, and the like.

What is claimed is:

1. A flash unit comprising:
   a flash device operable to emit light;
   a storage member operable to store the flash device;
   a cover with which the storage member is covered from above, and to which the flash device is attached;
   a first link member that is turnably connected to the storage member at one end and turnably connected to the cover at another end; and
   a second link member which, at one end, is turnably connected to the storage member at a position different from the connection portion of the first link member and the storage member, and, at another end, is turnably connected to the cover at a position different from the connection portion of the first link member and the cover, wherein:
   the first link member is stored in the storage member in a lying state when the flash device is not used, and the first link member is adapted to turn about a connection portion of the first link member and the storage member to take a raised up state in which a connection portion of the first link member and the cover is located above the connection portion of the first link member and the storage member when the flash device is used,
   a first imaginary straight line extending through a central axis about which the first link member is turnably connected to the storage member is different and disposed apart from a second imaginary straight line extending through a central axis about which the second link member is turnably connected to the storage member;
   the second link member has a cylindrical structure; and
   an electric wiring for connecting the storage member and the flash device is passed through an internal space of the second link member.

2. The flash unit according to claim 1, further comprising a retaining member operable to retain the first link member in the raised up state.

3. The flash unit according to claim 2, further comprising a biasing unit operable to turn the second link member about the connection portion of the storage member and the second link member to bias the second link member such that a connection portion of the second link member and the cover is located higher than a connection portion of the second link member and the storage member.

4. An imaging apparatus comprising the flash unit according to claim 3.

5. The imaging apparatus according to claim 4, wherein a depth of the cover is equal to a depth of the imaging apparatus.

6. An imaging apparatus comprising the flash unit according to claim 2.

7. The imaging apparatus according to claim 6, wherein a depth of the cover is equal to a depth of the imaging apparatus.

8. The flash unit according to claim 1, wherein the first link member is, at one end, turnably connected to a front portion of the storage member, and is, at another end, turnably connected to a rear portion of the cover, and
   the flash device is attached to a rear surface of the cover.

9. An imaging apparatus comprising the flash unit according to claim 8.

10. The imaging apparatus according to claim 9, wherein a depth of the cover is equal to a depth of the imaging apparatus.

11. An imaging apparatus comprising the flash unit according to claim 1.

12. The imaging apparatus according to claim 11, wherein a depth of the cover is equal to a depth of the imaging apparatus.

13. The flash unit according to claim 1, wherein the cover can turn about the connection portion with the first link member to take the raised up state in which the flash device is raised higher than the connection portion with the first link member.

14. An imaging apparatus comprising the flash unit according to claim 13.

15. The imaging apparatus according to claim 14, wherein a depth of the cover is equal to a depth of the imaging apparatus.

16. The flash unit according to claim 1, wherein
   when the flash device is used,
   a connection portion of the second link member and the storage member is disposed above the connection portion of the first link member and the storage member, and a connection portion of the second link member and the cover is disposed above the first link member and the cover, or
   a connection portion of the second link member and the storage member is disposed under the connection portion of the first link member and the storage member, and a connection portion of the second link member and the cover is disposed under the first link member and the cover.

17. An imaging apparatus comprising the flash unit according to claim 16.

18. The imaging apparatus according to claim 17, wherein a depth of the cover is equal to a depth of the imaging apparatus.

19. The flash unit according to claim 1, wherein each of the first link member and the second link member is provided on both a right side and a left side of the flash unit.

* * * * *